United States Patent [19]

Hsieh

[11] Patent Number: 5,245,536
[45] Date of Patent: Sep. 14, 1993

[54] PORTABLE ELECTRONIC FINANCIAL CALCULATOR AND PLANNER

[75] Inventor: William Hsieh, Ramsey, N.J.

[73] Assignee: Sharp Electronics Corporation, Mahwah, N.J.

[21] Appl. No.: 435,209

[22] Filed: Nov. 9, 1989

[51] Int. Cl.[5] .................. G06F 15/20; G06G 7/52
[52] U.S. Cl. .................. 364/408; 364/709.04; 364/225; 364/918
[58] Field of Search .......... 364/408, 709.04, 225, 364/918, 401; 235/78 F, 88 F

[56] References Cited

U.S. PATENT DOCUMENTS

| | | | |
|---|---|---|---|
| 3,610,902 | 10/1971 | Rahenkamp | 364/200 |
| 3,863,060 | 1/1975 | Rode et al. | 364/709.04 |
| 3,946,218 | 3/1976 | Rode et al. | 364/408 |
| 4,486,849 | 12/1984 | Harigaya et al. | 364/408 |
| 4,507,745 | 3/1985 | Agrawal | 364/709.04 |
| 4,530,068 | 7/1985 | Nakanishi et al. | 364/710.13 |
| 4,866,634 | 9/1989 | Reboh et al. | 364/408 |
| 5,058,009 | 10/1991 | Yoshino et al. | 364/408 |

FOREIGN PATENT DOCUMENTS

| | | |
|---|---|---|
| 251454 | 7/1988 | European Pat. Off. |
| 59-68072 | 4/1984 | Japan |
| 59-123986 | 7/1984 | Japan |
| 62-214463 | 9/1987 | Japan |

OTHER PUBLICATIONS

Article entitled "A Handheld Business Consultant"; Susan L. Wechsler; Hewlett-Packard Journal; vol. 38, No. 8; Aug., 1987; pp. 4-10.

*Primary Examiner*—Donald E. McElheny, Jr.
*Assistant Examiner*—Laura Brutman

[57] ABSTRACT

A portable electronic financial calculator and planner displays all the variables associated with the financial problem to be calculated on one screen to enable the user to more efficiently input numeric information corresponding to the various variables of the desired financial calculation. To display all the variables in common English terms, the portable financial calculator and planner has separated the financial problems into separate applications which enables this device to display variables distinct to the selected problem. This portable financial calculator and planner includes a display panel having at least eight lines of multi-digit display units. The portable electronic financial calculator and planner also has an input device which allows the operator to input numeric information into the fields corresponding to the known variables of the financial problem by allowing the user to utilize a movable cursor which is capable of moving from field to field. This input device also includes an answer request symbol to allow the user to assign one variable of the financial problem as the unknown variable to be determined. By displaying all the variables on one screen and allowing the user to input numeric information into any field associated with the variables of the financial problem through the use of a cursor, the portable electronic financial calculator and planner allows the user to operate it without extensive training.

20 Claims, 11 Drawing Sheets

```
AMOUNT OF LOAN
         94,000.00
ANN RATE %  10.50
# OF PMT   360.00
(MONTHLY)  PMT
→          859.85
BALLOON PAYMENT
             0.00
```

FIG. 6(a)

```
PRESENT BALANCE
          5,000.00
(MONTHLY)  ADD
→            280.97
ANN RATE %   10.00
# OF YEARS   20.00
FUTURE BALANCE
         250,000.00
```

FIG. 6(b)

```
ANNUAL
INTEREST RATE  (%)
       18.00000000

EFFECTIVE
YIELD (%)
→      19.71642450
```

FIG. 6(c)

```
PRICE →        87.29
COUPONS %       7.20
PURCHASE DATE
            10/23/90
MATURITY DATE
             1/ 1/97
MAT VALUE   100.00
YLD TO MAT   10.00
```

FIG. 6(d)

PORTABLE ELECTRONIC FINANCIAL CALCULATOR AND PLANNER

The present invention relates to a portable electronic financial calculator and planner, and more specifically, to a portable electronic financial calculator and planner which is capable of displaying the information needed to calculate the desired financial function or problem such that the displayed information is readily recognizable to an every day consumer.

BACKGROUND OF THE PRESENT INVENTION

Presently, many business, real estate, and professional people utilize preprinted rate tables to assist in calculating loan payments, the amount to lend or borrow, or compare various offers from different financial institutions. On the other hand, many business, real estate and professional people utilize financial calculators to solve these various problems.

The advantage in utilizing the rate tables is the low cost of obtaining these rate tables from the financial institutions. However, there are also disadvantages associated with these rate tables. One disadvantage associated with the rate table is the consumption of time needed to obtain the information from the rate table. For example, to find the payment for a loan for a certain interest rate and payout period, one has to look up on the rate table for the payment associated the known interest rate and payout period and multiply the amount found in the rate table by the actual amount of the loan and divide this product by a thousand to get the actual monthly payment. Another disadvantage is that the rate tables are not precise because one rate table cannot possibly list all the possible combinations of rates and payout periods that a user may desire and thus, a user cannot always get the exact answer desired.

To overcome these disadvantages of the rate tables, financial calculators have been developed. However, these financial calculators have various disadvantages. One of the disadvantages is that the present financial calculators are difficult to use because these financial calculators require the user to modify the desired financial problem to meet the various specifications of the financial calculator and planner. To modify the problem to the specifics of the financial calculator and planner, the user usually has to go through a lengthy period of training before the actual use of the calculator. Moreover, the present financial calculators only display one variable of the problem at a time, thereby causing the user to possibly lose track of which variables of the problem have already been entered. Because these financial calculators do not display all the variables for the particular problem on the screen at one time, the user of the financial calculator and planner usually has to write down the various variables as the numerical information is being entered upon the financial calculator and planner, thereby also requiring the user to have a writing utensil and recording medium along with the financial calculator and planner.

SUMMARY OF THE PRESENT INVENTION

In realizing the various disadvantages of the prior art devices, the present invention utilizes a portable electronic financial calculator and planner which is capable of overcoming the various disadvantages of the prior art. The present invention provides an easy-to-use portable electronic financial calculator and planner that allows the user to choose a specific financial problem. By allowing the user to choose a specific financial problem, the present invention is capable of displaying all the questions or variables associated with the financial problem to be solved in commonly used English terms such that the user may be able to utilize the present invention without referring to a manual or attending a lengthy training process. By displaying all the variables at once, the user merely has to input the known information corresponding to the variables of the financial problem without regard to sign notation and actuate a solve key upon completion of this inputting process.

The present invention then calculates the results of the variable having no inputted information associated with it. Also, the present invention allows the user to utilize this electronic financial calculator and planner without the need to use any other tools such as a pencil, paper, or lengthy manual. For example, the user of the present invention need not use a pencil or paper to keep track of the data being entered into the present invention because all the variables associated with the desired financial problem appear simultaneously on one screen, and upon actuation of a help key, the present invention informs the user of the needed information to carry out the financial problem, thereby eliminating the need for a lengthy manual.

To realize these advantages, one preferred embodiment of the present invention breaks up the financial categories into various financial problems and assigns each financial problem to a single key input to be chosen or activated by the user. This preferred embodiment includes a display panel capable of displaying all the variables associated with the chosen financial problem. This embodiment also includes an input device which allows the user to input numeric information into the various fields associated with the displayed variables through the use of an user controlled movable cursor, as well as, the financial problem to be solved. The input device also allows the user to input an answer request symbol into the field associated with the variable that is unknown, i.e., desired to be known.

In another preferred embodiment of the present invention, the portable electronic financial calculator and planner utilizes a method which determines the financial function to be carried and displays upon a display screen all the variables associated with the selected financial function. This method also allows the portable electronic financial calculator and planner to receive numeric information from a user through the use of numeric keypads and an user controlled movable cursor. In carrying out this method, the portable electronic financial calculator and planner solves for the variable having no assigned numeric value and displays all the variables and the associate numeric values for the user to view upon completing of the financial calculations.

OBJECTS OF THE PRESENT INVENTION

It is therefore an object of the present invention to provide a portable electronic financial calculator and planner which is capable of helping a user solve financial problems relating to loans, annuities, savings, and the like.

It is another object of the present invention to provide a portable electronic financial calculator and planner which is capable of solving financial problems relating to loans, annuities, savings, and the like in a quick and accurate manner.

It is a further object of the present invention to provide a portable electronic financial calculator and planner which allows the user to solve financial problems relating to loans, annuities, savings, and the like, without the user having to utilize other tools such as pencils, paper, or lengthy manuals.

It is still a further object of the present invention to provide a portable electronic financial calculator and planner which allows the user to solve financial problems relating to loans, annuity, savings, and the like, without the user going through a lengthy period of training before the actual use of the portable electronic financial calculator and planner.

It is still a further object of the present invention to provide a portable electronic financial calculator and planner which breaks out financial problems into separate financial application problems that can be chosen by an user so that only variables associated with the chosen financial problems will be displayed.

It is still a further object of the present invention to provide a portable electronic financial calculator and planner which displays all the variables involved in solving financial problems relating to loans, annuities, savings, and the like.

It is still a further object of the present invention to provide a portable electronic financial calculator and planner which displays the inputted information along with the represented variables simultaneously with the desired result and associated variable.

These and further objects of the present invention will become more readily apparent from a better understanding of the preferred embodiments described below with reference to the following drawing Figures.

BRIEF DESCRIPTION OF THE DRAWINGS

The present invention will become more fully understood from the detailed description given below and the accompanying drawings which are given by way of illustration only and are not intended to limit the present invention, and wherein:

FIG. 6(a) illustrates an example of the display shown on the display screen when the present invention is in the loan and annuity mode;

FIG. 6(b) is an example of the display shown on the display screen when the present invention is in the savings mode;

FIG. 6(c) is an example of the display shown on the display screen when the present invention is in the rate versus yield mode;

FIG. 6(d) is an example of the display shown on the display screen when the present invention is in the bond mode.

Figure 1:
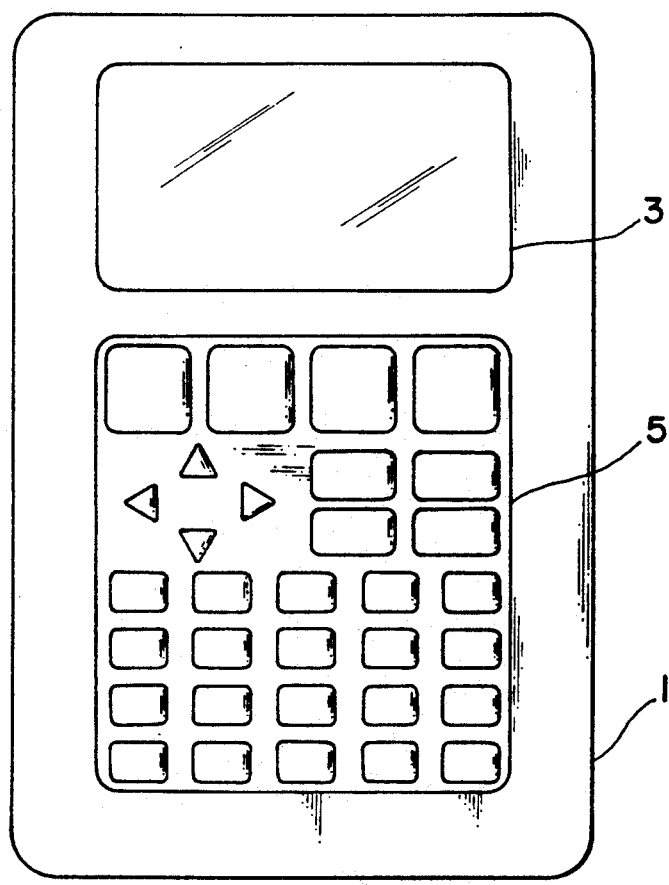
FIG. 1 illustrates one embodiment of the present invention.

The above-mentioned drawings will be described in detail in the following detailed description.

DETAILED DESCRIPTION OF THE PREFERRED EMBODIMENTS OF THE PRESENT INVENTION

The present invention will be better understood by reference to the detailed description presented below. In the drawings, like reference numerals represent the same elements.

FIG. 1 represents a preferred embodiment of the present invention. In FIG. 1, the portable electronic financial calculator 1 is of the size and shape to easily fit in the user's pocket or to be held in one hand during use or operation. This portable electronic financial calculator and planner 1 includes a display screen 3 and a keyboard 5. Keyboard 5 is utilized to input information from the user to indicate which financial problem is to be solved or the numeric information associated with the variables related to the desired financial problem to be solved. In the present invention, financial problems are separated into separate applications so that specific variables for the selected financial problems can be displayed, thereby eliminating confusion realized in the conventional devices caused by displaying general variables which are associated with any financial problem. Upon selecting the desired financial problem, the display screen 3 displays all the variables associated with the selected financial problem simultaneously upon the screen. The actual displaying of these variables will be further discussed below with respect to FIGS. 6(a) to 6(d).

Figure 2:
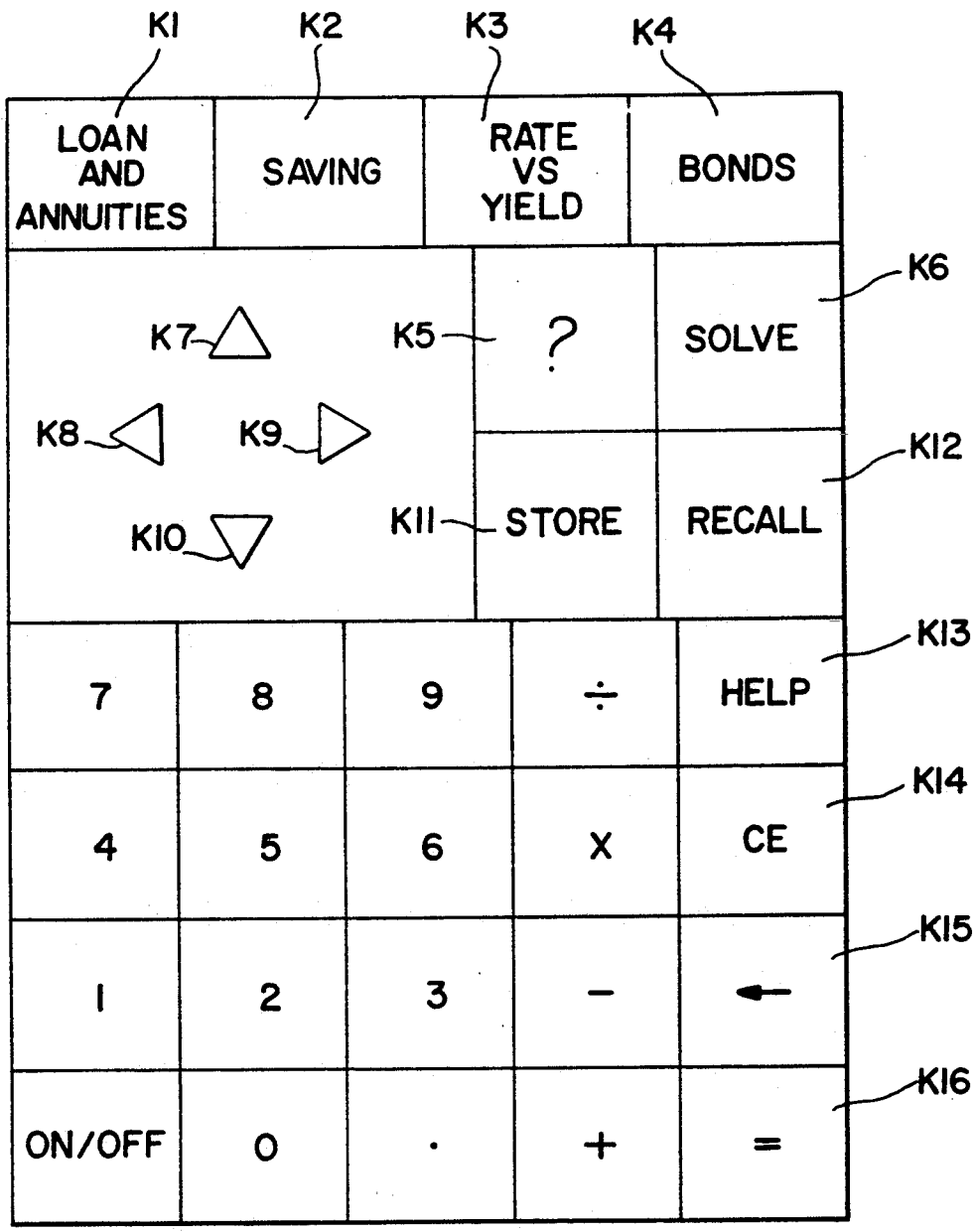
FIG. 2 illustrates the layout of the keyboard of the embodiment illustrated in FIG. 1.

FIG. 2 illustrates a detailed layout of the keyboard 5 of the preferred embodiment of FIG. 1. In FIG. 2, four keys, K1 through K4, respectively, represent the various financial problems that have been separated out to assist the user in using the present invention and can be selected by the user of the present invention. For example, the first key K1 represents the loan and annuities problem, the second key K2 represents the savings problem, the third key K3 represents the rate versus yield problem, and the fourth key K4 represents the bonds problem. In FIG. 2, fifth key K5, represents the answer request symbol whereby the user informs the present invention that this variable is the unknown variable within the financial problem. A sixth key K6 represents the solve key which instructs the present invention to solve the financial problem utilizing the numeric information inputted for the various variables associated with the desired financial problems. Seventh through tenth keys, K7 through K10, respectively, assist the user in moving a cursor which is displayed on the display screen 3. The cursor assists the user in entering the various numeric information associated with the known variables of the financial problem. Eleventh and twelfth keys, K11 and K12, respectively, allow the user of the present invention to utilize store and recall functions, respectively, for the entered numeric information associated with the selected financial problem. A Help key K13 allows the user to obtain information concerning either the selected financial problem or the various variables associated with the selected financial problem. This information can be either a description of the financial problem selected in terms readily understandable to a user or information for each individual variable. To obtain information about the selected financial problem, the user activates the Help key K13 when all the variable fields are cleared or contain an answer request symbol. If the user merely desires information concerning a variable, the user moves the cursor to the field associated with the variable (the field being cleared or having an answer request symbol) and activates the Help key K13. A clear entry key K14 allows the user to erase the entire entry within the field associated with the present position of the cursor upon single activation, or erase all the fields on the screen upon double activation. A fifteenth key, K15, allows the user to erase the last entered number without erasing the entire entry.

The keyboard 5 also includes numeric keys for the digits 0 through 9 for the actual entering of numeric information, as well as a keypad representing a decimal point. With respect to the entering of numeric information into each field associated with the variable of the selected financial problem, the keyboard 5 includes basic mathematical function keys which allow the user to perform mathematical calculations within each field. These functions are, for example, multiplication, division, subtraction, and addition. With respect to these mathematical calculations within the field associated with the variable of the desired financial problem, the keyboard 5 includes an equal key K16 which instructs the present invention to carryout only the mathematical calculation associated with the field corresponding to the present position of the cursor on the display screen. Lastly, the keyboard 5 includes an ON/OFF switch.

Figure 3:
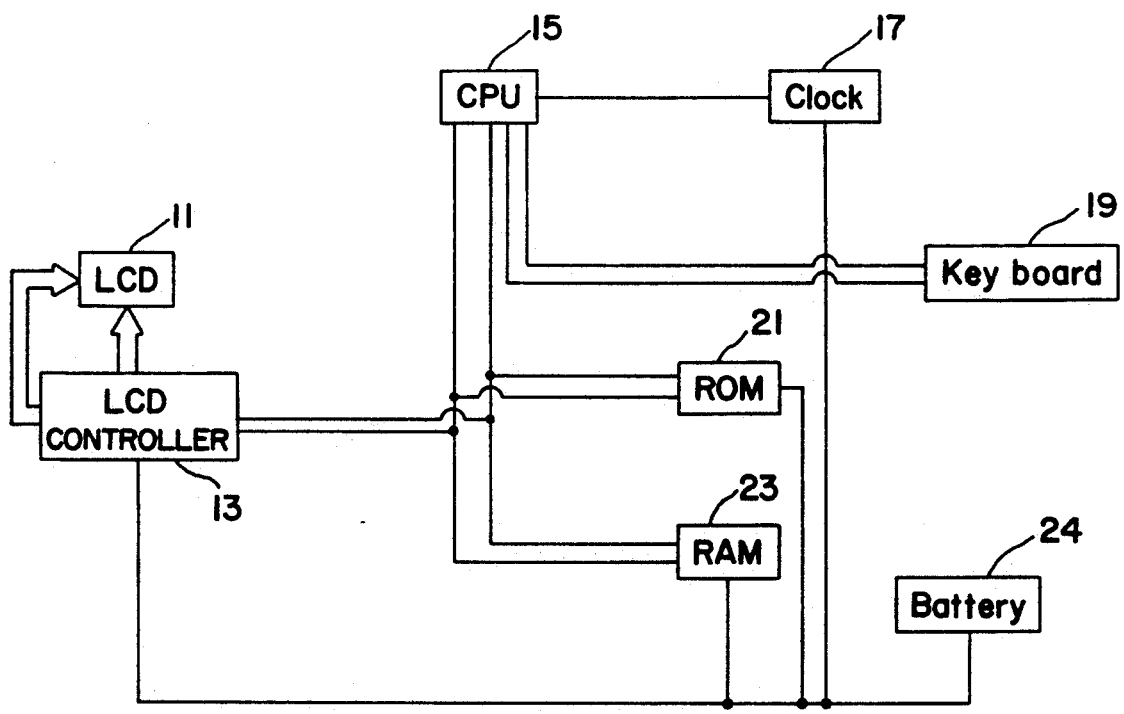
FIG. 3 illustrates a block diagram of the circuit utilized in the present invention.

FIG. 3 illustrates a block diagram of the circuit utilized by the present invention. In one preferred embodiment of the present invention, the display screen 3 is represented by a liquid crystal display device 11 which has at least eight lines of multi-digit display units. This liquid crystal display device 11 is connected to a liquid crystal display controller 13 which controls the displaying of information upon the liquid crystal display device 11. The liquid crystal display controller 13 receives power from a battery 24. The battery 24 also supplies power to a clock 17, a ROM 21, and a RAM 23. In FIG. 3, a keyboard 19 is utilized to input information into a central processing unit 15. The central processing unit 15 is connected to the clock 17, the ROM 21, and the RAM 23. The clock 17 provides clock pulses to the CPU 15 to assist the CPU 15 in carrying out the instructions necessary to solve the financial problems selected by the present invention. The mathematical relationships utilized by the CPU 15 to solve the financial problems selected by the present invention are stored in the ROM 21. Also, the numeric information utilized in the calculations of the CPU 15 are inputted through the keyboard 19 and temporarily stored in the RAM 23. The CPU 15 is also connected to the liquid crystal display controller 13 to supply the liquid crystal display controller 13 with the information to be displayed on the liquid crystal display device 11.

Figure 4:
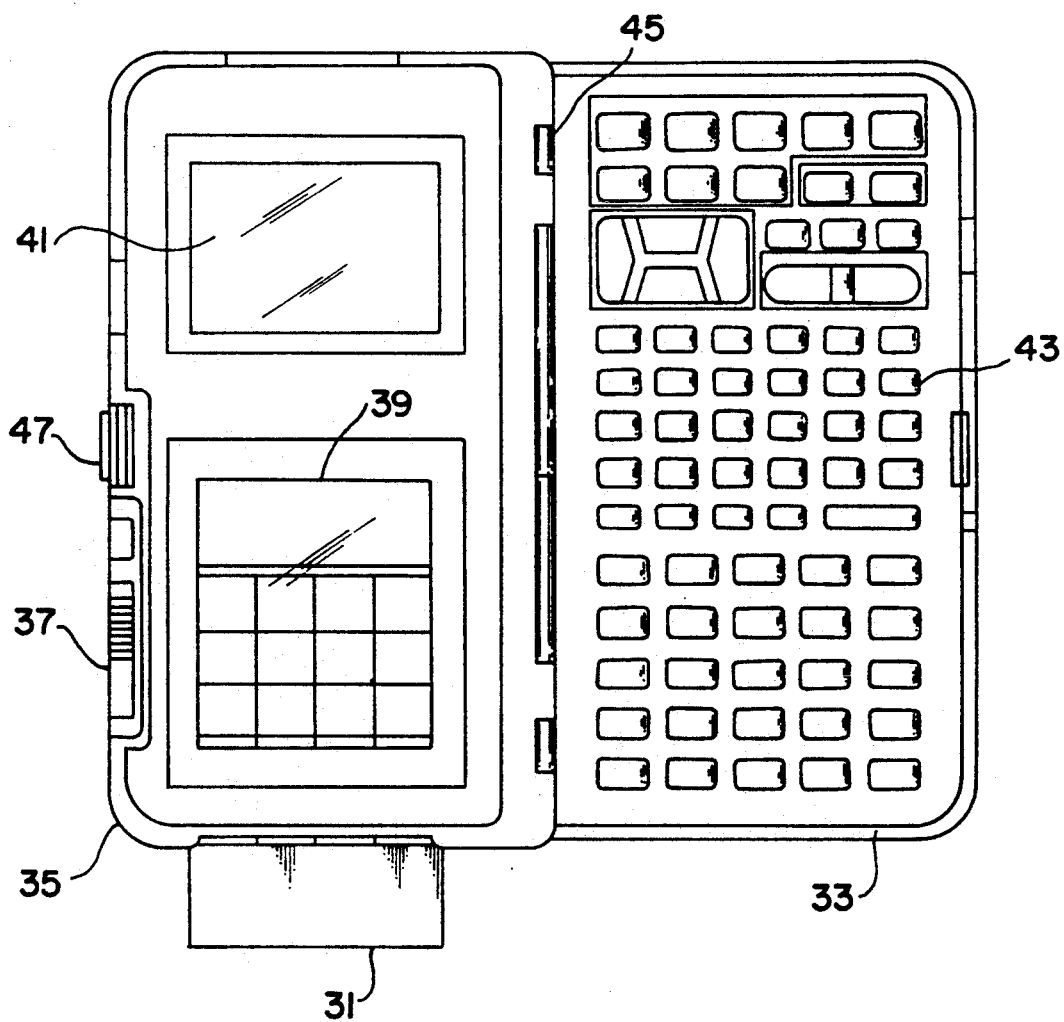
FIG. 4 illustrates another preferred embodiment of the present invention.

FIG. 4 illustrates another preferred embodiment of the present invention. In this preferred embodiment of the present invention, the portable electronic financial calculator and planner is divided into first and second sides, 33 and 35, respectively. These two sides 33 and 35 are attached by a hinge 45 which allows sides 35 and 33 to overlay each other in a closed position while being carried or transported. The two sides 33 and 35 respectively, are locked together in the closed position through a locking mechanism 47.

The first side 33 includes a keyboard 43 which allows the user to input the needed information in response to the inquiries or inferences generated by the selected financial problem. The second side 35 includes a display screen 41 for displaying all the variables and numeric information associated with the selected financial problem. The second side 35 also includes a receiving portion 39 for receiving an integrated circuit memory card 31 associated with the money planner functions. This integrated circuit card 31 is shown in more detail in FIG. 5. Upon receiving the integrated circuit card 31 in the receiving portion 39, a locking device 37 locks the integrated circuit card into its proper position within the receiving portion 39. However, this electronic apparatus will be capable of operating other functions properly (i.e., calculator functions and the like) if the integrated circuit card 31 is not properly locked in position within the receiving portion 39. The position of the integrated circuit card 31 will only affect the performing of the financial calculations.

Figure 5:
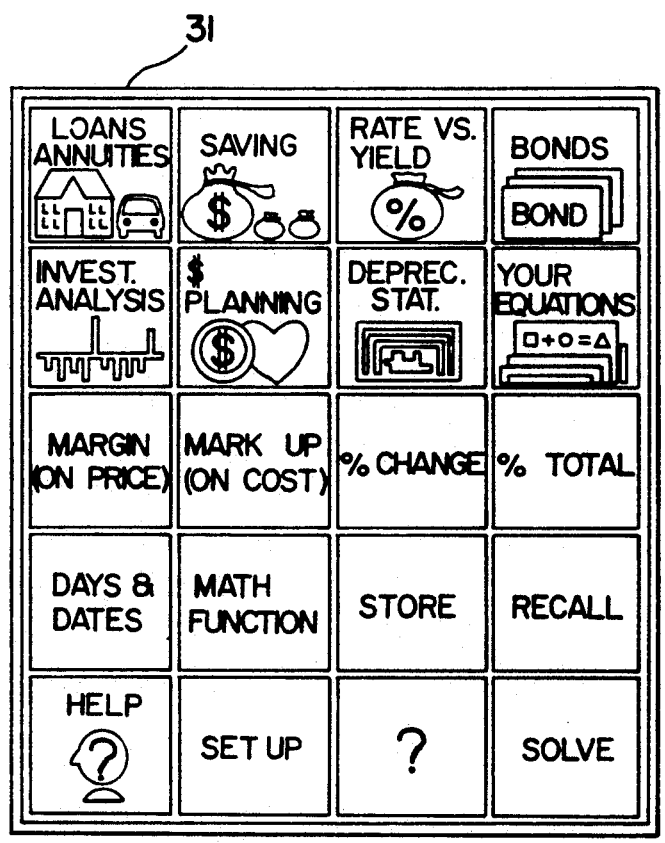
FIG. 5 illustrates a detachable keyboard and memory for the preferred embodiment illustrated in FIG. 4.

FIG. 5 is a detailed drawing of the integrated circuit card 31 utilized in the preferred embodiment of FIG. 4. This integrated circuit card 31 includes memory; i.e., a ROM; for storing the mathematical relationships associated with the designated financial functions of the present invention and a keyboard for inputting instructions into the electronic apparatus in FIG. 4 which are used to carry out the functions of the portable electronic financial calculator and planner of the present invention. The keyboard of the integrated circuit card 31 includes keys representing the operational modes of loans and annuities; savings; rates versus yield; bonds; investment analysis; money planning; depreciation status; and a mode which allows equations to be inputted by the user. Upon activation of one of these keys, the display screen 41 of FIG. 4 will display all the variables associated with this financial problem. The integrated circuit card 31 also contains various instruction keys which are similar to those described with respect to FIG. 2, such as store, recall, help, etc.

FIGS. 6(a) through 6(d) illustrate examples of the displays shown on the display screen upon the selection of some of the various financial problems or operational modes. For example, FIG. 6(a) illustrates an example of the display showing the various variables associated with the loan and annuities financial problem. FIG. 6(b) shows an example of the various variables shown on the display device upon the actuation of the savings financial problem. FIG. 6(c) illustrates an example of the various variables shown on the display device upon selecting the rates versus yield function. Lastly, FIG. 6(d) demonstrates an example of the displaying of the various variables upon selection of the bond financial problem.

As can be seen from FIG. 6(a) through 6(d), by separating the financial problems into separate applications; i.e., loan and annuities, savings, rates versus yield, and bond; the present invention is capable of displaying variables in common English terms which are distinct to the chosen problem. This combination of separating the financial problems into distinct applications and displaying all the associated variables of the present invention avoids the confusion inherent in the conventional devices which display the same general variables in non-common English terms for all the different financial problems. For example, in the conventional devices, "PV" can represent the amount of a loan in a loan problem or the present amount in a savings problem. To understand the meaning of "PV", one needs to take extensive training courses or read lengthy manuals. On the other hand, in the present invention, as shown in FIGS. 6(a) through 6(d), the variables are displayed in common English terms, such as, "loan amount" instead of "PV" for a loan problem, etc.

Figure 7A:
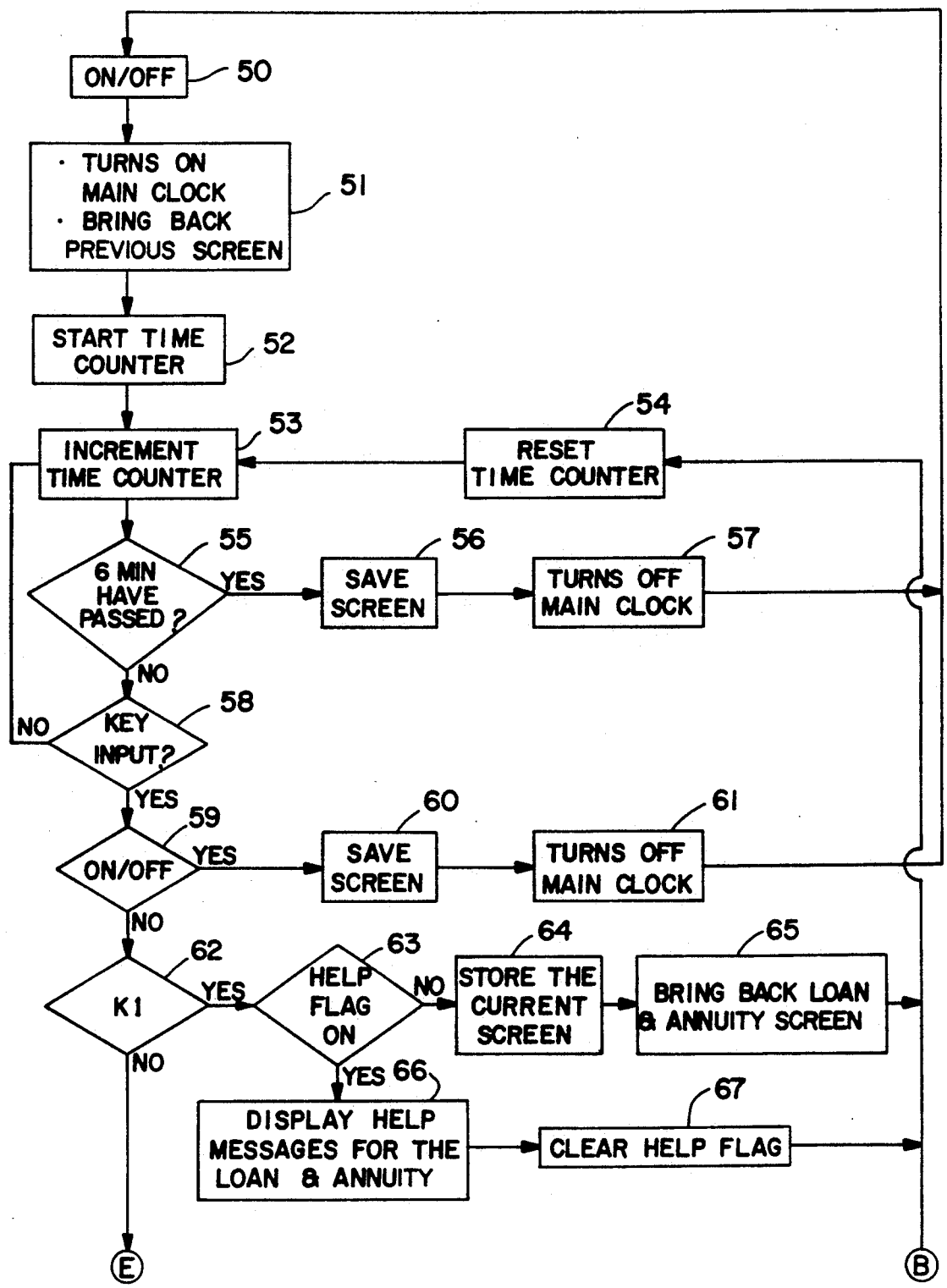
FIGS. 7(a) through 7(e) illustrate the flowchart of the process carried out by the present invention.

FIGS. 7(a) through 7(e) illustrate the flowchart that shows the process carried out by the preferred embodiments of the present invention. In FIG. 7(a), at step 50, the present invention determines whether the ON/OFF switch has been actuated. Upon actuation of the ON switch, the present invention turns on the main clock and displays the screen that was previously being shown prior to the activation of the OFF switch, at step 51. The time counter is then started at step 52 to be utilized in determining whether six minutes have passed between the actuation of a key input operation. This time counter is incremented at step 53. At step 55, the present invention determines whether six minutes have passed by reading the contents within the time counter. If six minutes have passed, the present invention saves the screen at step 56 and turns off the main clock at step 57. However, if six minutes have not passed, the present invention determines whether a key input operation has been activated at step 58. If no key input operation has been determined at step 58, the process returns to step 53 whereby the time counter is incremented. On the other hand, if a key input operation has been detected at step 58, step 59 determines whether the ON/OFF switch has been activated. If the ON/OFF switch has been activated at step 59, the present invention saves the screen at step 60 and turns off the main clock at step 61.

Also, in FIG. 7(a), if step 59 of FIG. 7(a) has determined that the ON/OFF switch has not been activated, the present invention determines whether the first key K1 of FIG. 2 has been activated at step 62. If the first key K1 has been activated, the present invention determines whether the help flag at step 56 is on. If the help flag is not set at step 63, the present invention stores the current screen at step 64 and displays the loan and annuities screen at step 65. Upon displaying the loan and annuities screen, the present invention resets the time counter at step 54 and returns to step 53 to increment the time counter. On the other hand, if the help flag is set at step 63, the present invention displays the help message associated with the loan and annuities function to describe to the user the type of problem that has been chosen at step 66 and clears the help flag at step 67. Upon clearing the help flag at step 67, the process of the present invention returns to step 54.

Figure 7B:
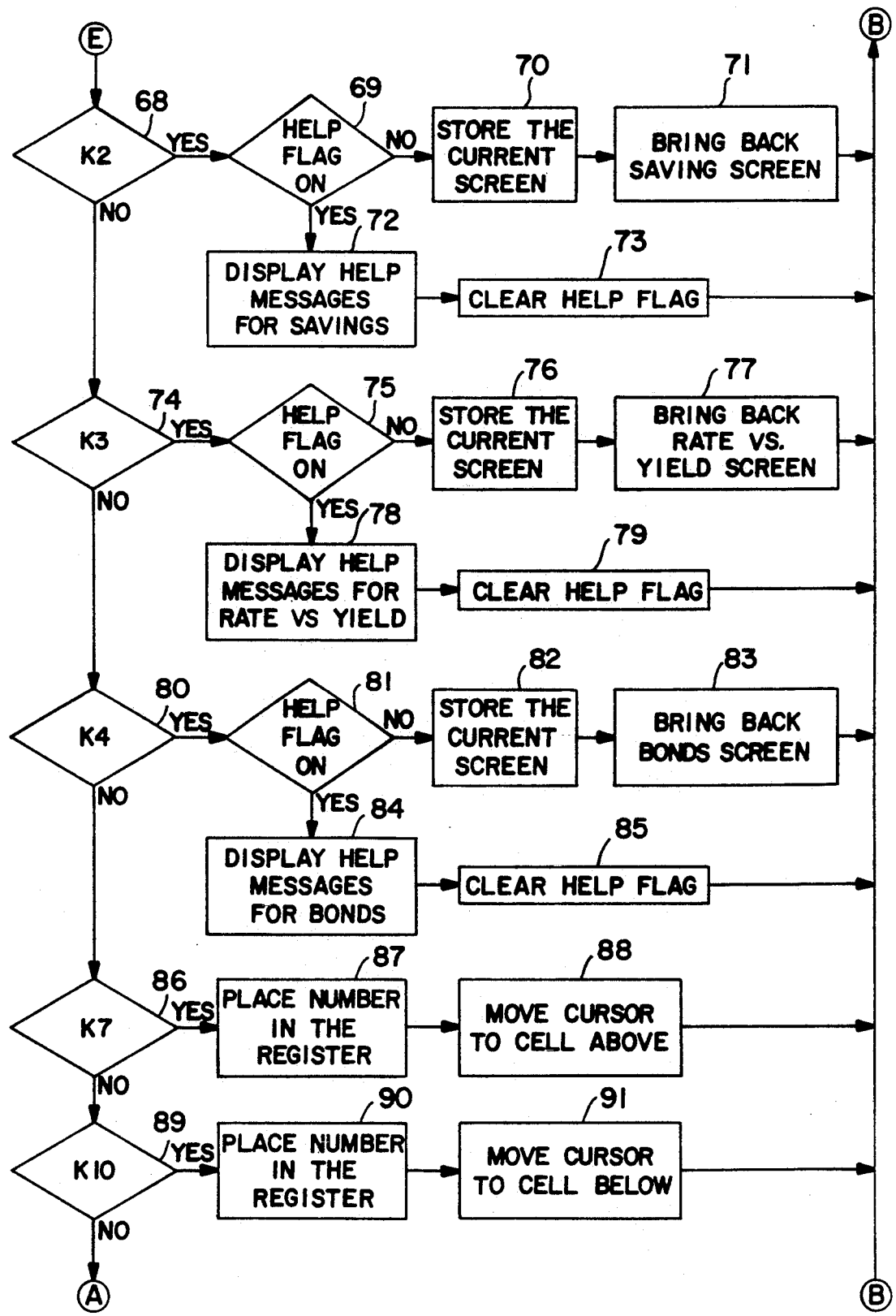

In FIG. 7(b), if at step 62, the present invention determines the first key K1 has not be actuated, the present invention determines at step 68 whether the second key K2 has been activated. If the second key K2 has been activated, the present invention determines whether the help flag has been set at step 69. If the help flag has not been set at step 69, the present invention stores a current screen at step 70 and displays the savings screen at step 71. Upon the displaying the savings screen at step 71, the process of the present invention returns to step 54. However, if at step 69, the present invention determines that the help flag is set, the present invention displays a help message associated with the savings function to describe to the user the type of problem that has been chosen at step 72 and clears the help flag at step 73 before returning to step 54.

If at step 68, the present invention determines that the second key K2 has not been actuated, the present invention determines at step 74, whether the third key K3 has been activated. If the third key K3 has been activated at step 74, the present invention determines whether the help flag has been set at step 75. If the help flag has not been set at step 75 the present invention stores the current screen and displays the rate versus yield screen before returning to step 54. However, if at step 75, the help flag has been set, the present invention displays the help messages associated with the rate versus yield financial problem to describe to the user the type of problem that has been chosen at step 78 and clears the help flag at step 79 before returning to step 54.

If at step 74, the present invention determines that the third key K3 has not been activated, the present invention determines whether the fourth key K4 has been activated at step 80. If the fourth key K4 has been activated at step 80, the present invention determines whether a help flag has been set at step 81. If the help flag has been set at step 81, the present invention stores the current screen at step 82 and displays the bond screen at step 83 before returning to step 54. However, if the present invention at step 81 determines that the help flag is set, the present invention displays the various help messages associated with the bond financial problem to describe to the user the type of problem that has been chosen at step 84 and clears the help flag at step 85 before returning to step 54.

If at step 80, the present invention determines that the fourth key K4 has not been activated, the present invention determines whether the seventh key K7 has been activated at step 86. If the seventh key K7 has been activated at step 86, the present invention stores the numeric information associated with the field related to the position of the cursor in a register at step 87 and then moves the cursor to the position above the present position at step 88 before returning to step 54. However, if the present invention determines that the seventh key K7 has not been activated at step 86, the present invention determines whether the tenth key K10 has been activated at step 89. If the tenth key K10 has been activated at step 89, the present invention stores the numeric information associated with the field related to the present position of the cursor in a register at step 90 and then moves the cursor to the position below the present position of the cursor before returning to step 54.

Figure 7C:
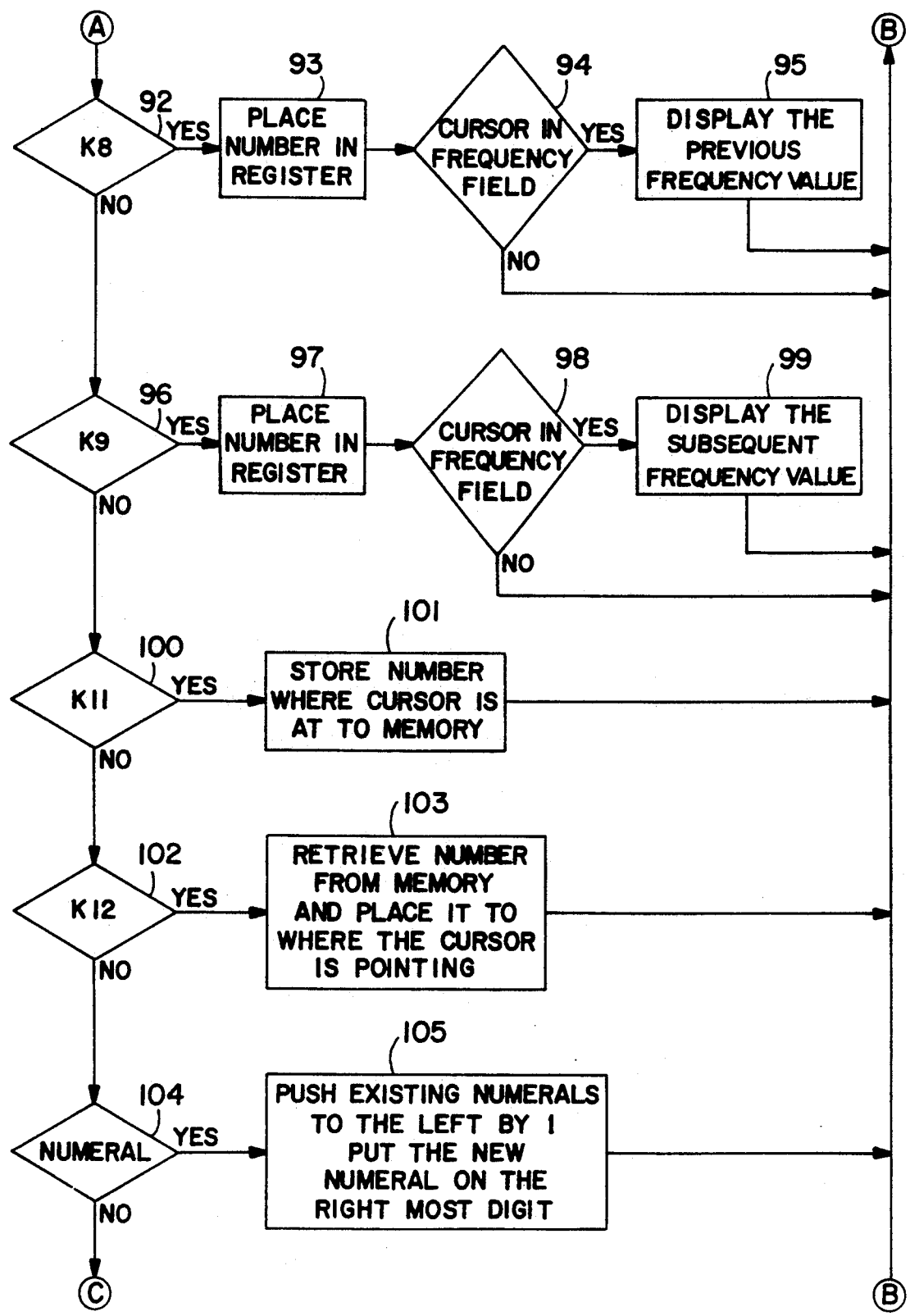

In FIG. 7(c), if the present invention determines that the key, K10, has not been activated at step 89, the present invention determines whether the eighth key K8 of FIG. 2, has been activated at step 92. If the eighth key K8 has been activated at step 92, the present invention stores the number in the field associated with the present position of the cursor at step 93 and determines whether the cursor is in the frequency field at step 94. If the cursor is in the frequency field at step 94, the present invention displays the previous frequency value at step 95 before returning to step 54. However, if the cursor is not in the frequency field of the display at step 94, the process of the present invention returns to step 54. In other words, if the present invention determines that the cursor is in the frequency field, the present invention displays the previous frequency value and returns to step 54. The frequency values in the preferred embodiment of the present invention are listed in the following sequential order: annual, semi-annual, quarterly, monthly, semi-monthly, bi-weekly, weekly, and daily.

If the present invention determines at step 92 that the eighth key K8 has not been activated, the present invention determines whether the ninth key K9 of FIG. 2, has been activated at step 96. If the ninth key K9 has been activated at step 96, the present invention stores the number in the field associated with the present position of the cursor at step 97 and determines whether the cursor is in the frequency field at step 98. If the cursor is in the frequency field at step 98, the present invention displays the subsequent frequency value at step 99 before returning to step 54. However, if the cursor is not in the frequency field of the display at step 98, the process of the present invention returns to step 54. In other words, if the present invention determines that the cursor is in the frequency field, the present invention displays the previous frequency value and returns to step 54. The frequency values in the preferred embodiment of the present invention are listed in the following sequential order: annual, semi-annual, quarterly, monthly, semi-monthly, bi-weekly, weekly, and daily.

If the present invention has determined at step 96 that the ninth key K9 has not been activated, the present invention determines at step 100 whether the eleventh key K11 has been activated. If the eleventh key K11 has been activated at step 100, the present invention stores the numeric information contained in the field related to the present position of the cursor in memory before returning to step 54. If at step 100, the eleventh key K11 has not been activated, the present invention determines at step 102 whether the twelfth key K12 of FIG. 2 has been activated. If the twelfth key K12 has been activated at step 102, the present invention retrieves the number stored in memory and places it in the field corresponding to the present position of the cursor at step 103 before returning to step 54.

However, if at step 102, the present invention determines that the twelfth key K12 has not been activated, the present invention determines at step 104 whether one of the numeric keypads has been activated at step 104. If one of the various numeric keypads have been activated at step 104, the present invention pushes the existing numerals within the field associated with the present position of the cursor to the left by one position and places the new activated numeral in the rightmost digital position at step 105 before returning to step 54.

Figure 7D:
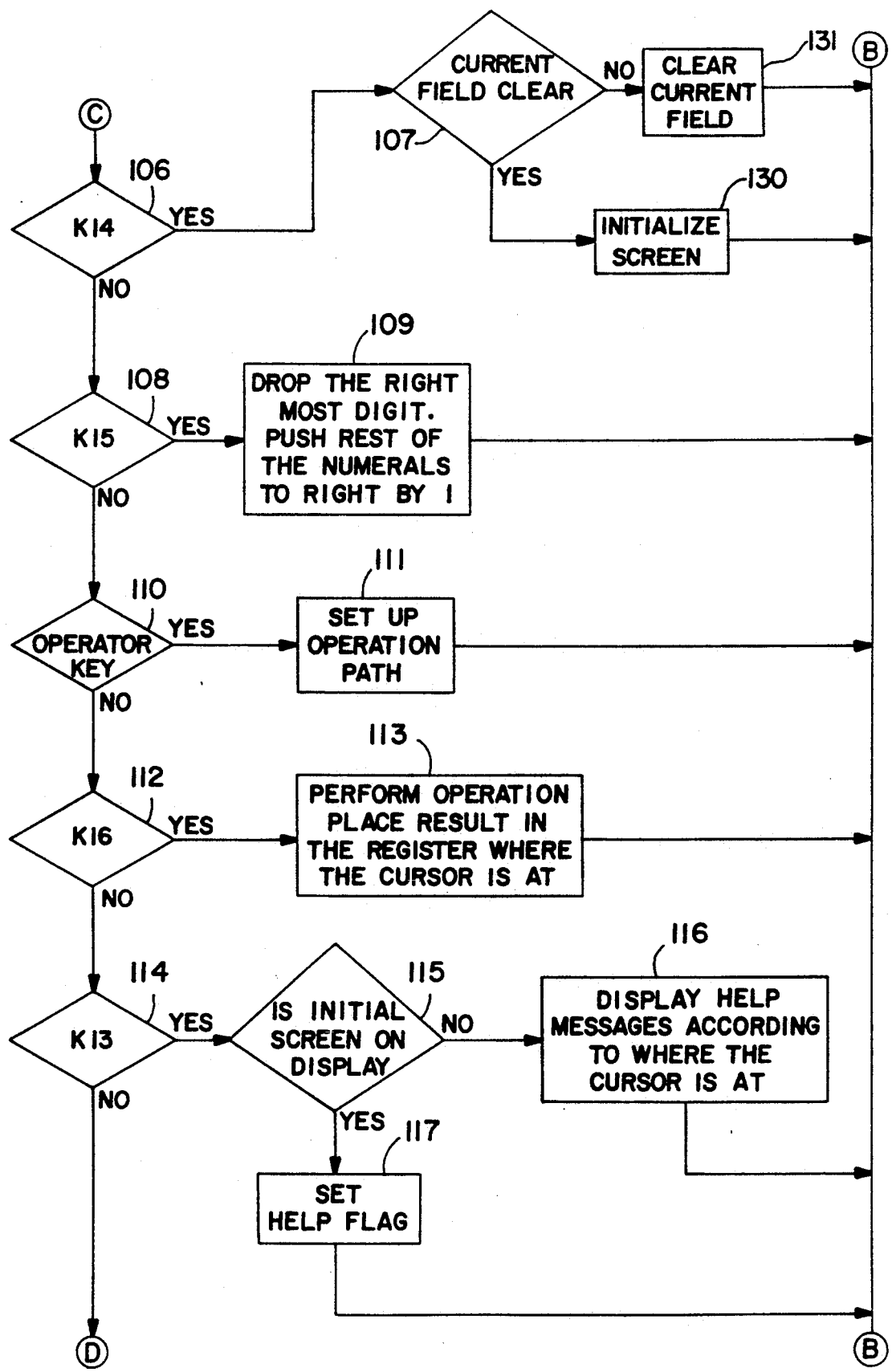

In FIG. 7(d), if the present invention at step 104 determines that no numeric keypad has been activated, the present invention determines whether the clear entry key K14 of FIG. 2 has been activated at step 106. If the clear entry key K14 has been activated at step 106, the present invention determines whether the current field has been previously cleared of its numeric information corresponding to the present position of the cursor at step 107. If the current field has been cleared at step 107, the present invention initializes all the fields of the present display at step 130 before returning to step 54. However, if the current field has not been cleared at step 107, the present display clears the field corresponding to the present position of the cursor at step 131 before returning to step 54. If at step 106, it is determined that the clear entry key K14 has not been activated, the present invention determines whether the fifteenth key K15 of FIG. 2 has been activated at step 108. If the fifteenth key K15 has been activated at step 108, the present invention clears the rightmost digit within the field corresponding to the present position of the cursor and pushes the remaining numerals in this field to the right by one position at step 109 before returning to step 54. However, if it is determined at step 108 that the fifteenth key K15 has not been activated, the present invention determines at step 110 whether a mathematical operator key has been actuated. If a mathematical operator key has been actuated at step 110, the present invention sets up the mathematical operation of step 111 prior to returning to step 54. If no equals key K16 has been actuated at step 110, the present invention determines whether the equals key K16 of FIG. 2, has been actuated at step 112. If the equals key K16 has been actuated at step 112, the present invention performs the mathematical operation previously inputted at step 110 and places the result of this mathematical operation in the register corresponding to the current position of the cursor of the display screen at step 113 before returning to step 54.

However, if it has been determined that the equals key K16 at step 112 has not been activated, the present invention determines whether Help the key K13 of FIG. 2 has been activated at step 114. If the Help key K13 has been activated at step 114, the present invention determines if the initial screen is being displayed at step 115. If the initial screen is not being displayed at step 115, the present invention displays the help messages corresponding to the present position of the cursor at step 116 prior to returning to step 54. However, if the present invention determines that the initial screen is being displayed at step 115, the present invention sets the help flag at step 117 prior to returning to step 54.

Figure 7E:
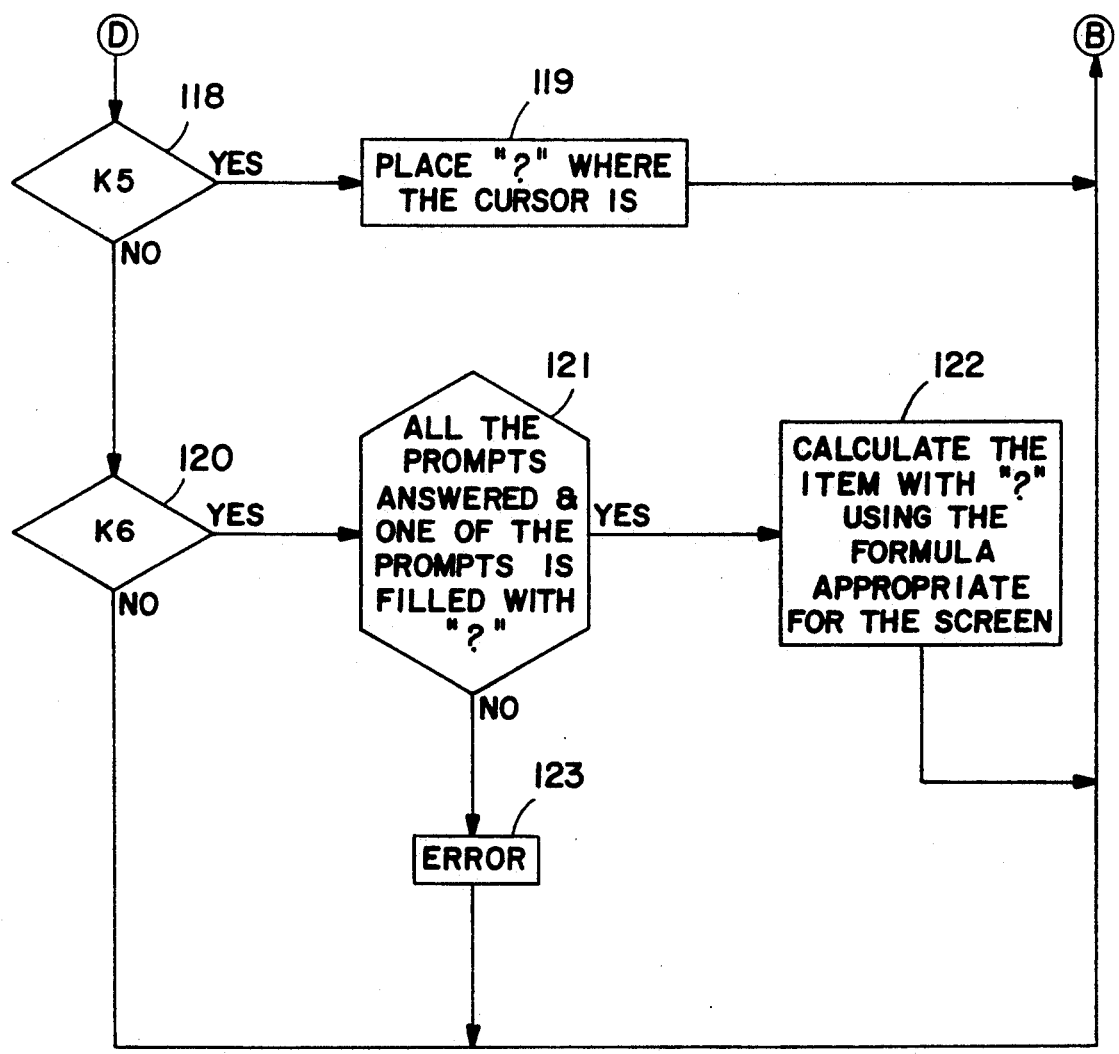

In FIG. 7(e), if it has been determined at step 114, that the Help key K13 has not been activated, the present invention determines whether the fifth key K5 of FIG. 2 has been activated at step 118. If the fifth key K5 has been activated at step 118, the present invention places a "question mark" at the present position of the cursor on the display screen at step 119 before returning to step 54. However, if it has been determined that the fifth key K5 has not been activated, the present invention determines whether the sixth key K6 of FIG. 2 has been activated at step 120. If the sixth key K6 has been activated at step 120, the present invention determines whether all the fields contain numeric information and that one of the fields is associated with a "question mark" at step 121. If this situation is not present at step 121, the present invention displays an error message at step 123 before returning to step 54. If this situation is present at step 121, the present invention calculates the variable associated with the "question mark" using a mathematical relationship corresponding to the financial problem displayed upon the display screen at step 122 prior to returning to step 54. However, if the present invention determines at step 120 that the sixth key K6 has not been activated, the process of the present invention returns to step 54.

OPERATIONS OF THE PRESENT INVENTION

In operating the present invention, the user of the portable electronic financial calculator and planner initially activates this device by selecting the ON/OFF switch of the keyboard shown in FIG. 2 or the keyboard on the first side 33 of FIG. 4. Upon turning on the present invention, the user selects one of a plurality of operational modes to determine the desired information corresponding to a certain financial problem. If, for example, the desired information concerns a financial problem corresponding to loans and annuities, the user would select or activate the first key K1 of FIG. 2 or the loan & annuities key of the integrated circuit card 31 of FIG. 5. In this example upon selecting the loans and annuities operational mode, the display 3 of FIG. 1 or display 41 of FIG. 4 will display a screen similar to the screen demonstrated in FIG. 6(a) except for the numeric information shown in FIG. 6(a). In displaying a screen similar to that shown in FIG. 6(a), the present invention informs the user of all the various variables in common English terms needed to calculate a loans and annuities financial problem. Upon being informed of all the various variables concerning a loans and annuities problem, the user is able to input the known information corresponding to the known variable while allowing the unknown variable to remain blank.

However, should the user be unfamiliar with a loan and annuities problem, the user may activate the Help key K13 of FIG. 2 or the Help key of FIG. 5. Upon activation of a Help key, the present invention will provide a descriptive message concerning the chosen problem which may include the variables involved. Also, if the user is unfamiliar with the meaning of a certain variable or the correct format of the information needed to be entered with respect to the variable, the user merely positions the cursor in the field of the unfamiliar variable and activates the Help key. Upon activation, the present invention will display information concerning the definition of the variable, as well as, in what format the information should be entered. This Help key enables the present invention to communicate to the user information concerning both the problem chosen and the variable involved with the chosen problem, without the use of a lengthy manual.

To assign a numeric value or numeric information to one of the variables of the loan and annuities problem, the user utilizes the seventh through tenth keys K7 through K10 to manipulate the cursor to the proper field corresponding to the variable to be assigned a numeric value. Upon positioning the cursor in the proper field, the user inputs the numeric value utilizing the numeric keys 0-9 and the decimal point key. However, if the numeric value to be entered is a mathematical calculation or operation, the present invention allows the user to also input the mathematical operation via the numeric keys, decimal key, and mathematical operator keys into the field associated with the variable to be assigned a numeric value. To carryout the mathematical operation within the field, the user then activates the equals key K16 of FIG. 2 or the corresponding "equals sign" key on the keyboard 43 of side 33 of FIG. 4. When activating this "equals sign" key, the present invention carries out the mathematical operation inputted in the field associated with the present position of the cursor and assigns the result of this mathematical operation to the variable associated with the position of the cursor. The user may also input the answer request symbol, "?", into the field associated with the present position of the cursor by activating the fifth key K5 of FIG. 2, or its corresponding key on the integrated circuit board 31 of FIG. 5. By inputting this answer request symbol into the field associated with the present position of the cursor, the present invention is informed that the variable associated with the present position of the cursor is to be an unknown variable in the calculations of the financial problem. Upon entering numeric values for all the fields associated with the financial problem, except the one field having been assigned to the answer request symbol, the user merely activates the "solve" key, sixth key K6 of FIG. 2, or the associated key on the integrated circuit card 31 of FIG. 5, to obtain the desired result of the financial problem. If the user has failed to assign only one field with the answer request symbol or the user has failed to assign a field with the answer request symbol, upon activating the solve key, the user will receive an error message indicating to the user that either an answer request symbol has not been presented or that the user has not presented enough numeric information to calculate the desired result.

If the user desires to calculate a financial problem corresponding to savings, rate versus yield, or bonds, the user merely activates one of the second through fourth keys K2 through K4, of FIG. 2 or the corresponding keys situated on the integrated circuit card 31 of FIG. 5. If the savings key is activated, the display screen 3 of FIG. 1 or the display screen 41 of FIG. 4 will display a format as shown in FIG. 6(b), except for the numeric values shown in FIG. 6(b). If the user is to activate the rate versus yield key, the display screen 3 of FIG. 1 or the display screen 41 of FIG. 4 will show the format demonstrated in FIG. 6(c), except for the numeric values shown. However, if the user selects the bonds key, the display 3 of FIG. 1 or the display 41 of FIG. 4 will show a format as illustrated in FIG. 6(d), except for the numeric values. The present invention also displays on the display screen 41 of FIG. 4, a similar format should the user activate one of the keypads, investment analysis, money planning, depreciation status, or "your equations" that are situated on the integrated circuit card 31 of FIG. 5. More specifically, the display screen 41 of FIG. 4 will display all the variables related to the selected operational mode or financial problem. The entering of information or numeric values with respect to these various other financial modes are similar to the entering of information described above with respect to the loans and annuities financial mode.

The present invention described above with reference to the accompanying drawings describes various preferred embodiments of the portable electronic financial calculator and planner constructed in accordance with the teachings of the present invention. It should be understood, however, that one of ordinary skill in the art could construct a variety of portable electronic financial calculators in accordance with the teachings of the present invention. It should, therefore, be understood that the present invention is not limited by the above-described preferred embodiments. The present invention is defined by the claims appended hereto, which are intended soley to define the present invention, including such changes and modifications that would occur to one of ordinary skill in the art within the spirit and scope of the appended claims.

What is claimed is:

1. A handheld electronic apparatus for calculating financial information comprising:

display panel means for displaying inquiries related to a desired calculation and including at least eight lines of multi-digit display units;

input means, operatively connected to said display panel means, for inputting numeric information into fields corresponding to at least three lines of said multi-digit display units, for inputting a desired financial calculation function from a plurality of functions and for inputting an answer request symbol for a variable from a plurality of chooseable variables associated with the inputted financial function;

said display panel means displaying inquiries associated with the variables corresponding to the inputted financial function and displaying the answer request symbol next to the inquiry associated with the operation of said input means, thereby communicating which inquiry of the inputted financial function is unknown;

memory means, operatively connected to said input means, for storing said numeric information inputted by said input means such that individual stored numeric information corresponds to a distinct variable, for storing said answer request symbol at a certain memory location indicating that an unknown variable is associated with said certain memory location, and for storing a mathematical relationship demonstrating a relationship between the stored numeric information and said unknown variable;

calculating means, operatively connected to said memory means, for calculating a result using said mathematical relationship corresponding to said unknown variable; and output means, operatively connected to said calculating means and said display panel means, for replacing said answer request symbol on said display panel means with said result from said calculating means.

2. The handheld electronic apparatus as claimed in claim 1, wherein said numeric information is inputted and displayed as positive numbers.

3. The handheld electronic apparatus as claimed in claim 1, further comprising:

field calculating means, operatively connected to said input means and said memory means, for calculating a field result from the numeric information inputted within the field using mathematical instructions inputted by said input means;

said memory means storing said field result such that said field result corresponds to a distinct variable.

4. The handheld electronic apparatus as claimed in claim 1, further comprising:

cursor means, operatively connected to said input means, and said memory means for applying said numeric information in a field to said memory means to be stored when a cursor leaves the field and enters a new field.

5. The handheld electronic apparatus as claimed in claim 1, wherein said inquiries are displayed in common English words relevant to the desired financial calculation.

6. The handheld electronic apparatus as claimed in claim 1, further comprising:

help means, operatively connected to said input means, for displaying information or instructions related to a chosen calculation or chosen inquiry.

7. A handheld electronic apparatus for calculating financial information comprising:

display panel means for displaying inquiries related to a desired financial calculation;

said display means including at least eight lines of multi-digit display units;

input means, operatively connected to said display means, for inputting numeric information into fields corresponding to at least three lines of said multi-digit display units;

detachable input means, operatively connected to said display means, for inputting a desired financial calculation function and for inputting an answer request symbol for a variable from a plurality of chooseable variables associated with the inputted financial function;

said display panel means displaying inquiries associated with the variables corresponding to the inputted financial function and displaying the answer request symbol next to the inquiry associated with the operation of said input means, thereby communicating which inquiry of the inputted financial function is unknown;

memory means, operatively connected to said input means, for storing said numeric information inputted by said input means such that individual stored numeric information corresponds to a distinct variable and for storing said answer request symbol at a certain memory location indicating that an unknown variable is associated with said certain memory location;

detachable memory means, operatively connected to said detachable input means, for storing a mathematical relationship corresponding to said desired financial calculation function;

said detachable input means causing said memory means to also store said mathematical relationship;

calculating means, operatively connected to said memory means and said detachable input means, for calculating a result using said mathematical relationship; and output means, operatively connected to said calculating means and said display means, for replacing said answer request symbol on said display means with said result from said calculator means.

8. The handheld electronic apparatus as claimed in claim 7, wherein said display means displays said inquiries simultaneously.

9. The handheld electronic apparatus as claimed in claim 7, wherein said display means displays said inquiries on lines of multi-digit display units distinct from lines of multi-digit display units displaying said numeric information or said answer request symbol.

10. The handheld electronic apparatus as claimed in claim 7, further comprising:

field calculating means, operatively connected to said input means and said memory means, for calculating a field result from the numeric information inputted within the field using mathematical instructions inputted by said input means;

said memory means storing said field result such that said field result corresponds to a distinct variable.

11. The handheld electronic apparatus as claimed in claim 7, further comprising:

cursor means, operatively connected to said input means and said memory means, for applying said numeric information in a field to in said memory means to be stored in said memory means when a cursor leaves the field and enters a new field.

12. The handheld electronic apparatus as claimed in claim 7, wherein said inquiries are displayed in common English words relevant to the desired financial calculation.

13. The handheld electronic apparatus as claimed in claim 7, further comprising:

help means, operatively connected to said input means, for displaying information or instructions related to a chosen calculation or chosen inquiry.

14. A method for calculating financial information utilizing a handheld electronic apparatus, comprising the steps of:

(a) determining a financial function from a plurality of financial functions to be carried out by the electronic apparatus;

(b) generating and displaying inferences on a display device associated with information needed to carry out the financial function determined;

(c) receiving information through an input device in response to the inferences generated and inputting an answer request symbol for an inference from a plurality of chooseable inferences associated with the inputted financial function;

(d) determining if the information received for any individual inference is the inputted answer request symbol;

(e) displaying the answer request symbol next to the inquiry associated with the execution of said step (c), thereby communicating which inquiry of the inputted financial function is unknown;

(f) storing the information received for an individual inference in a distinct memory location upon determining that the received information is not an answer request symbol;

(g) assigning an unknown variable to an individual inference in a distinct memory location upon determining that the received information is an answer request symbol; and (h) calculating a value for the unknown variable using a relationship associated with the determined financial function; and (i) displaying on the display device the calculated value in lieu of the answer request symbol along with the stored information and the inferences.

15. The method as claimed in claim 14, wherein said step (a), comprises the sub-steps of:
 (a1) receiving numeric information through the input device;
 (a2) receiving a mathematical instruction relating to the numeric information received;
 (a3) calculating a field result from the numeric information and the mathematical instruction; and
 (a4) storing the field result as the received information responsive to inferences generated.

16. The method as claimed in claim 14, wherein all inferences associated with the information needed to carry out a financial function are simultaneously displayed.

17. The method as claimed in claim 14, further comprising the steps of:
 (i) displaying on the display device help information for each individual financial function; and
 (j) displaying on the display device help information for each individual inference associated with the selected financial function.

18. The method as claimed in claim 14 wherein said step (b) displays the inference in common English terms relevant to the desired financial calculation.

19. A handheld electronic apparatus for calculating financial information comprising:
 display panel means for displaying a plurality of inquiries corresponding to variables involved in a desired calculation;
 input means, operatively connected to said display panel means, for inputting numeric information into fields displayed on said display panel means, said numeric information being values for a plurality of said variables, and for inputting an answer request symbol in a field displayed on said display panel means corresponding to an unknown variable, said unknown variable being selectable from any of said variables;
 calculating means, operatively connected to said input means, for calculating a result as a function of said variables and said unknown variable; and
 output means for replacing said answer request symbol on said display panel means with said result from said calculating means.

20. The handheld electronic apparatus as claimed in claim 19 wherein said plurality of inquiries are displayed in common English terms relevant to the desired financial calculation.

* * * * *